Figure 1:
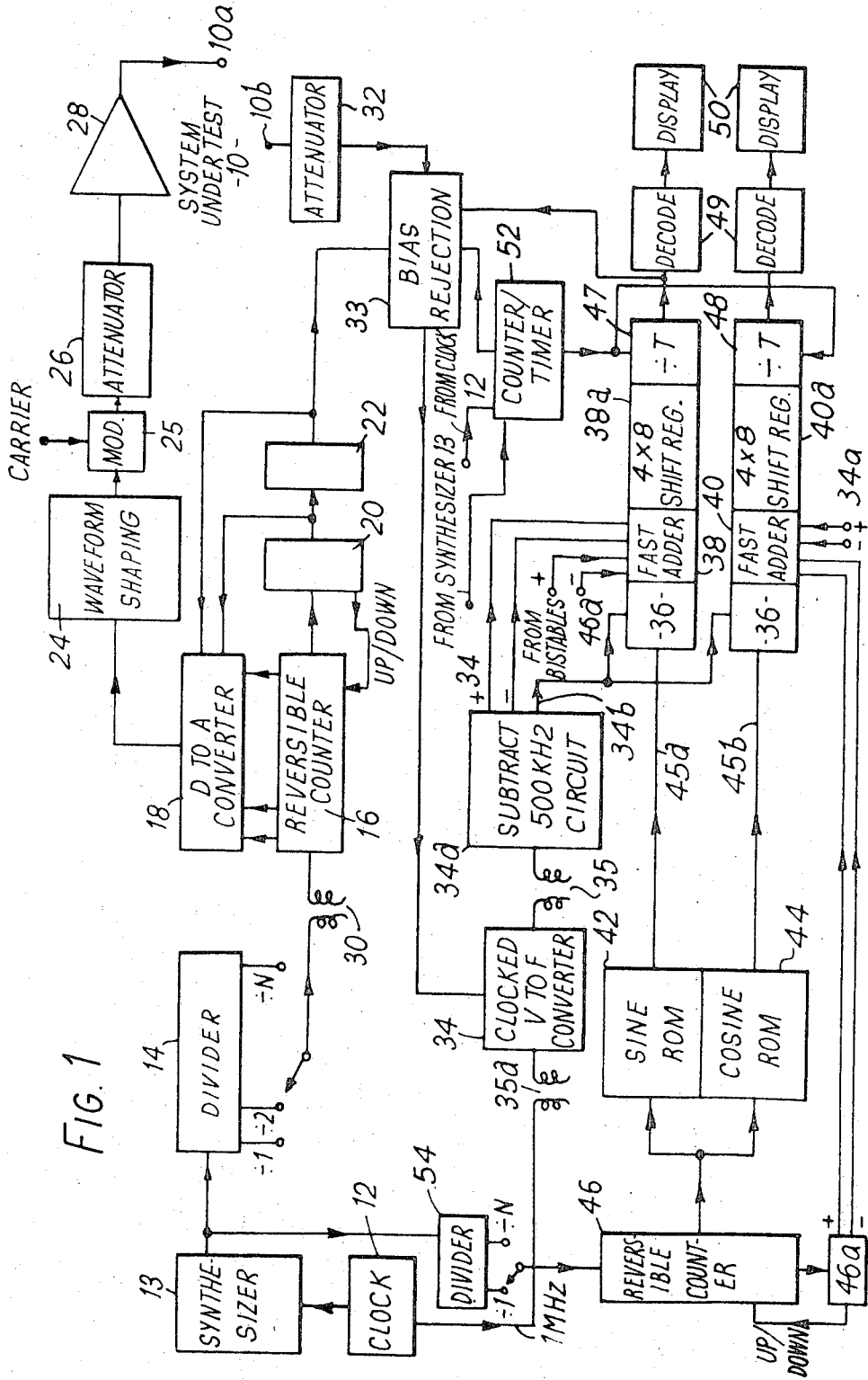

United States Patent [19]
Jackson

[11] 3,808,526
[45] Apr. 30, 1974

[54] FREQUENCY RESPONSE ANALYSER

[75] Inventor: Barrie Jackson, Farnham, England

[73] Assignee: The Solartron Electronic Group Limited, Farnborough, Hampshire, England

[22] Filed: June 12, 1973

[21] Appl. No.: 369,330

[30] Foreign Application Priority Data
June 12, 1972 Great Britain.................. 27409/72
Aug. 30, 1972 Great Britain.................. 40151/72

[52] U.S. Cl............................................. 324/57 R
[51] Int. Cl............................................. G01r 27/00
[58] Field of Search...... 324/57 R, 78 R, 78 J, 77 B

[56] References Cited
UNITED STATES PATENTS

| | | | |
|---|---|---|---|
| 2,714,657 | 8/1955 | Stein | 324/57 R X |
| 3,382,432 | 5/1968 | Schittko et al. | 324/57 R |
| 3,513,385 | 5/1970 | Pascoe | 324/57 R |
| 3,623,141 | 11/1971 | Boatwright | 324/57 R |
| 3,659,060 | 4/1972 | Wolff et al. | 324/57 R X |

Primary Examiner—Stanley T. Krawczewicz
Attorney, Agent, or Firm—William R. Sherman; Roylance, Abrams, Berdo & Kaul

[57] ABSTRACT

Apparatus for analysing the frequency response of an electrical system to a test signal comprises means for generating a test signal from a digital synchronising signal, and for applying this test signal to the system. Optionally the test signal may be used to modulate a carrier which is applied to the system. The output signal from the system is applied to a V to F converter, whose output frequency is instantaneously proportional to the amplitude of the output signal. To effect correlation of the output signal from the system with the test signal, digital signals representative of sine and cosine values are read out of respective ROMs under the control of the digital synchronising signal, and these values are respectively accumulated at a rate determined by the frequency produced by the V to F converter. This has the effect of digitally multiplying the output signal from the system by the test signal (or a harmonic or subharmonic thereof), to determine the in phase and quadrature components thereof.

When the output signal from the system includes an unwanted D.C. or carrier frequency component, the apparatus can be used to reject the unwanted component. To reject an unwanted D.C. component, the output signal from the system is subjected to two successive multiplications by a signal at the test signal frequency, so as to produce a D.C. signal proportional to the D.C. component, and this D.C. signal is stored and subsequently used to back-off the unwanted D.C. component. An unwanted carrier frequency component is rejected by demodulating the output signal from the system to produce a D.C. component proportional to the carrier frequency component, processing this D.C. component as already described to produce a D.C. signal, and modulating this D.C. signal at the carrier frequency to produce a signal for backing off the carrier frequency component.

18 Claims, 2 Drawing Figures

FREQUENCY RESPONSE ANALYSER

This invention relates to apparatus for analysing the frequency response of an electrical system to a test signal. Such apparatus will hereinafter be referred to as a transfer function analyser (TFA), since it enables, inter alia, the determination of the transfer function of the system between two terminals. To this end the TFA must generate a test signal for application to one terminal and be able to correlate the output signal at the other terminal with the test signal. The test signal is most commonly sinusoidal. To effect the correlation, the output signal is multiplied by at least one reference signal which bears a synchronous relationship to the test signal, having either the same frequency as the test signal or a harmonically related frequency. Normally two reference signals in quadrature are utilized in order to ascertain the in-phase and quadrature components of the output signal at the reference frequency.

It is already known to employ digital techniques to some extent in TFA's, in particular in generating the test signal. One object of the present invention is to extend the use of such techniques to the correlation in order to take advantage of one of the benefits of digital circuits, namely absolute accuracy within the digitally established limits of resolution.

However, in some circumstances the output signal from the system under test may include a D.C. component which is substantially larger than the A.C. component: for example, a typical signal of this kind may comprise a 1 volt (peak) A.C. signal superimposed upon a D.C. pedestal of 100 volts. In such a case, the TFA must normally be set to a measurement range which is capable of accepting and measuring an input of at least 100 volts. As a result of this, the resolution of measurements of the A.C. component of the output signal is seriously reduced, typically by a factor of one hundred in the example mentioned above. Even when the magnitudes of the A.C. and D.C. components are of the same order, their sum may necessitate the use of a higher measurement range than would be required for the A.C. component alone.

Further, when the electrical system to be tested is a carrier system, it is desirable to employ the test signal to modulate a carrier signal of much higher frequency than the test signal, and to apply the modulated carrier signal to the system. In this case the output signal from the system includes a component at the carrier frequency, which component may again be much larger than the component of interest, i.e. the component due to the test signal. The resolution of the measurements of the component of interest is thus again adversely affected.

It is another object of the present invention to provide a frequency response analyser which reduces the resolution problem due to the presence of unwanted D.C. or carrier frequency components, thereby permitting the magnitude of a relatively small A.C. component of interest in the output signal from the system to be measured with relatively high resolution when a larger D.C. and/or carrier frequency component is also present in the output signal.

According to one aspect of the present invention, therefore, there is provided apparatus for analysing the frequency response of an electrical system to a test signal, comprising:

a source of a synchronizing signal;

first means responsive to the synchronizing signal to derive a test signal at a lower frequency than that of the synchronizing signal for application to the system;

second means responsive to the synchronizing signal to produce a sequence of digital signals representative of successive point values in a cycle of a reference signal;

third means responsive to the output signal from the system to convert the instantaneous value of this signal to a frequency represented by a train of pulses; and means for accumulating the values generated by the second means at a rate determined by the rate of the said pulses.

Since the rate at which the digital values are accumulated is determined by the instantaneous value of the output signal, the said accumulation has the effect of multiplying the output signal by the reference signal. The accumulated number represents the magnitude of the component of the output signal in phase with the reference signal, provided that suitable measures are taken to normalize this number correctly. The accumulation is effected over a predetermined number of cycles of the reference signal, the accumulated number then being divided by the total duration of these cycles.

According to another aspect of the present invention, apparatus for measuring the frequency response of an electrical system to a test signal comprises:

means for producing a test signal of predetermined frequency for application to the system;

first multiplier means for receiving the output signal from the system, which output signal may include a D.C. component in addition to an A.C. component, the first multiplier means being arranged to multiply this output signal by a first signal whose frequency is equal to the frequency of the test signal;

second multiplier means connected to receive the output from the first multiplier means and arranged to multiply it by a second signal whose frequency is equal to the frequency of the test signal, whereby to produce a D.C. signal whose magnitude is dependent upon the magnitude of said D.C. component;

summing means for receiving the output signal from the system;

means for applying the said D.C. signal to the summing means in opposition to said D.C. component, whereby to substantially cancel said D.C. component; and multiplying means operable, when said D.C. component has been cancelled, to multiply the output signal from the summing means by a reference signal whose frequency is equal, or harmonically related, to the frequency of the test signal.

Thus, in effect, the D.C. component is first isolated and measured to produce a D.C. voltage which is dependent thereon, this D.C. voltage is then used to back off the D.C. component, leaving only the A.C. component, and the A.C. component is then multiplied by a signal whose frequency is equal to the frequency of the test signal, or is a harmonic or subharmonic thereof, to determine its relationship thereto, e.g. the magnitude of its in-phase and/or quadrature components.

According to yet another aspect of the present invention, apparatus for measuring the frequency response of an electrical system to a test signal comprises:

means for producing a test signal of predetermined frequency;

modulating means for modulating a carrier signal having a higher frequency than that of the test signal with the test signal, to produce a modulated signal for application to the system;

demodulating means for receiving and demodulating the output signal from the system, so as to produce a demodulated signal having a D.C. component whose magnitude is dependent upon the amplitude of the carrier frequency component of the output signal from the system;

first multiplier means arranged to multiply the output signal from the demodulating means by a first signal whose frequency is equal to the frequency of the test signal;

second multiplier means arranged to multiply the output of the first multiplier means by a second signal whose frequency is equal to the frequency of the test signal, so as to produce a D.C. signal whose magnitude is dependent upon said D.C. component;

means for modulating said D.C. signal at the carrier frequency to produce a feedback carrier frequency signal whose amplitude is dependent upon the amplitude of the carrier frequency component of the output signal from the system;

summing means for receiving the output signal from the system;

means for applying said feedback carrier frequency signal to the summing means in opposition to said carrier frequency component in the output signal from the system, so as to substantially cancel said carrier frequency component; and multiplying means operable when said carrier frequency component has been cancelled to multiply the output signal from the summing means by a reference signal whose frequency is equal, or harmonically related, to the frequency of the test signal.

Figure 2:
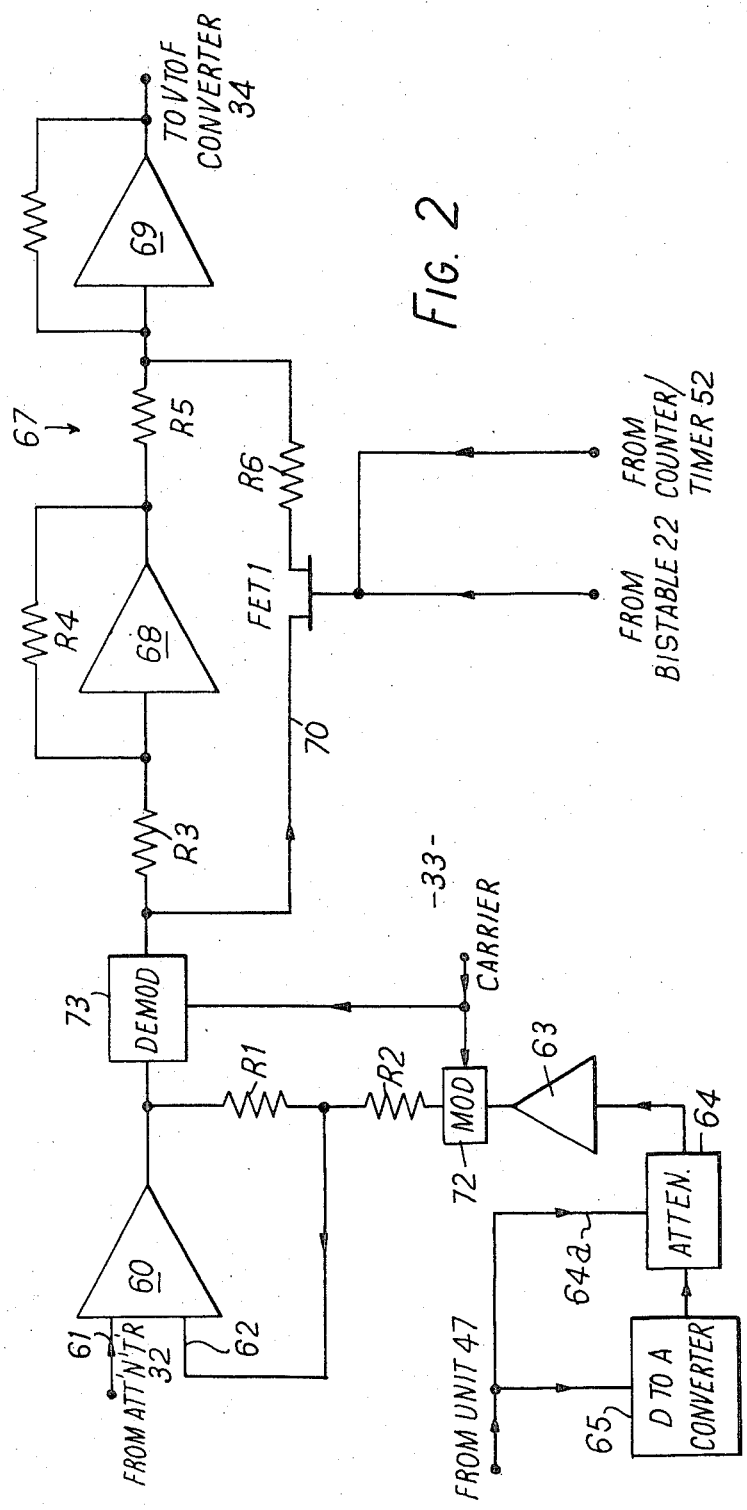

The invention will now be described, by way of non-limitative example, with reference to the accompanying drawings, of which:

FIG. 1 is a block circuit diagram of a transfer function analyser in accordance with the present invention; and FIG. 2 is a more detailed circuit diagram of part of the transfer function analyser of FIG. 1.

Referring to FIG. 1, a system under test 10 has a terminal 10a to which a sinusoidal test signal is to be applied and a terminal 10b from which an output signal is derived for correlation with two reference signals. The whole apparatus is synchronized by a clock pulse oscillator 12 which may operate at a frequency 1 MHz. In order to be able to generate test signals at different frequencies the oscillator 12 feeds a frequency synthesizer 13, which includes its own oscillators, mixers and dividers (not shown), and uses known techniques to produce an output signal which is phase-locked to the synchronizing signal produced by the oscillator 12 and is discretely variable in frequency. The output of the synthesizer 13 is connected, via a variable frequency divider 14, to a reversible counter 16. The counter 16 counts up and down cyclically and its contents are converted to an analogue signal by a digital-to-analogue converter 18. The states of the counter cover only one quadrant of a cycle and the overflow output of the counter is accordingly connected to two bistable circuits 20 and 22 in cascade. These circuits respectively produce outputs defining the quadrants and polarity of the test signal and are also applied to the digital-to-analogue converter 18. To produce test signals whose frequency is greater than 1 kHz, the counter 16 typically counts from 0 to 50 and then back to 0, while to produce test signals whose frequency is 1 kHz or less, the counter 16 typically counts from 0 to 500 and then back to 0, and the state of the bistable circuit 20 is utilized to control whether the counter counts up or down. The analogue output from the converter 18 is applied to a waveform shaping circuit 24 whose output constitutes the required test signal. This type of circuit for generating a sinusoidal waveform from clock pulses is known in itself and will not be described in any greater detail.

The test signal is applied to the terminals 10a through a programmable attenuator 26 and an output amplifier 28. A modulator circuit 25 is provided between the waveform shaping circuit 24 and the attenuator 26, for modulating an external carrier with the test signal if desired; means for applying a D.C. bias to the test signal may also be provided if desired.

In order to allow the apparatus to be used with any system 10 regardless of the potentials on the terminals 10a and 10b, various isolation transfromers are provided. Thus an isolation transformer 30 is provided between the divider 14 and the counter 16. The whole of the circuitry downstream of the transformer is fully floating, that is to say, it has its own isolated power supplies. Control signals (e.g. for programming the attenuator 26) are applied to the floating circuitry by way of touch keys and either pulse transformers or photoelectric couplings.

The output signal obtained from the terminals 10b may include a D.C. component and/or a carrier frequency component in addition to an A.C. component of interest resulting from the test signal: this output signal is therefore applied, via an automatically variable attenuator 32, to a combined bias and carrier frequency component rejection circuit 33, which will hereinafter be referred to simply as the bias rejection circuit. The bias rejection circuit 33 is connected to receive a control signal from the bistable circuit 22, and operates to remove the D.C. component or the carrier frequency component from the output signal from the terminals 10b, in a manner which will be described hereinafter in more detail with reference to FIG. 2. The output signal produced by the circuit 33 is applied to a voltage to frequency (V to F) converter 34. The section of the TFA from the terminals 10b to and including the converter 34 is also fully floating. V to F converters are well known, one suitable circuit being described in our British Patent Specification No. 950,647. This is a clocked voltage to frequency converter and a clock signal is accordingly applied thereto, via an isolation transformer 35a, from the oscillator 12. The output pulses from the V to F converter are taken out via an isolation transformer 35.

Briefly, the V to F converter 34 operates by applying the analogue signal from the bias rejection circuit 33 to an integrator. Each pulse from the clock oscillator 12 causes an opposing standard unit of charge to be applied to the integrator provided the output of the integrator exceeds a threshold level. The output of the integrator therefore hovers around the threshold level and only such clock pulses as are utilized in accordance with the aforesaid proviso are passed to the output of the V to F converter. It follows that the mean rate of these pulses is proportional to the analogue input.

It is necessary to handle instantaneous analogue inputs of either polarity. One known method of doing this is to utilize standard units of charge of both polarities, but it is preferred in this embodiment of the invention to make use of another technique. This consists in superimposing the analogue input on a D.C. offset equal to the full scale magnitude of the analogue input. The modified analogue input is accordingly unipolar, and the output pulse rate from the V to F converter ranges from 0Hz to 1MHz as follows:

0 Hz corresponds to a full scale negative analogue value;
500 kHz corresponds to a zero analogue value;
1 MHz corresponds to a full scale positive analogue value.

The output of the converter 34 is then "normalised" by applying it to a 500 kHz frequency subtracting circuit 34a, which subtracts 500 kHz therefrom. The circuit 34a comprises a plurality of gates and bistable circuits arranged to control the passage of pulses from the converter 34 as follows. In each successive time interval embracing two clocking intervals of the converter 34, i.e. each successive 2 microseconds, there can only be zero, one or two pulses from the converter 34. If there are no pulses, the circuit 34a itself produces a pulse on line 34b, together with a minus signal on line 34c; if there is only one pulse, the circuit 34a blocks it and produces no polarity signal; and if there are two pulses, the circuit 34a blocks only one of them and produces a plus signal on line 34d. It can be seen that this has the effect of subtracting 500 kHz from the frequency produced by the converter 34.

Each pulse from the converter 34 is utilized to open two sets of parallel gates 36. The inputs to these gates consist of bit parallel highways 45a and 45b on which appear respectively a succession of digital point values in BCD read out of two ROM's 42 and 44. The two ROM's respectively provide sine and cosine outputs. Cyclic read out of the contents of the two ROMs is effected under the control of another reversible counter 46, which is driven from the synthesizer 13 via a further variable frequency divider 54 and which incorporates bistable circuits 46a corresponding to the bistables 20 and 22 for determining the alternate counting up and down of the counter.

Each time the gates 36 open the existing sine and cosine values on the highways 45a and 45b are added into respective fast parallel adders 38 and 40 which operate as accumulators. These are BCD adders and may each have a total capacity of 8 BCD digits. Each ROM produces its output in two decades of BCD, the outputs being applied over four parallel lines, least significant decade first, to the respective blocks 38, 40, each of which comprises a four-bit parallel adder followed by a 4 × 8 recirculating shift register. As each output arrives at the adder, the number already in the register is recirculated through the adder, a decade at a time, least significant decade first, for addition. Eight decades of capacity in the shift registers is sufficient for accumulating over a period of up to 10 seconds: after 10 seconds of accumulation, the contents of the shift registers are divided by 10 (by a simple right-shift as viewed in the drawing), and a divide-by-10 frequency divider is switched into the output line from the circuit 34a. The 10 second period is measured by a counter-timer 52, which receives input signals from the oscillator 12 and synthesizer 13, and whose outputs are also connected to arithmetic units 47, 48 described below. The counter/timer 52 also serves as a sequence controller for controlling the sequence of the various stages of the operation of the TFA, and has a control output 52a connected to the bias rejection circuit 33.

The adders 38 and 40 add algebraically under control of the sign signals on lines 34c and 34d and sign signals on lines 56a and 56b from the bistables 46a.

Depending upon the setting of the dividers 14 and 54, the quadrature reference signals represented by the point values on highways 45a and 45b may have the same frequency as the test signal or a harmonically related frequency. Thus the output signal from the system 10 may be tested for harmonics or subharmonics.

The numbers accumulated in the adders 38 and 40 have to be correctly scaled, having regard to the number of cycles of the signal at the terminals 106 over which accumulation takes place. The two adders are therefore followed by arithmetic units 47 and 48 which are connected to the output of the counter timer 52 and divide the contents of the adders by a number T proportional to the duration of said number of cycles. The outputs from the dividing units 47 and 48 are applied to decoders 49 whose outputs are in turn applied to display devices 50 which indicate the magnitude of the in-phase and quadrature components of the output signals from the system 10 at the frequency of the two reference signals. The output of the unit 47 is also connected to control the attenuation factor of the attenuator 32, and to the bias rejection circuit 33.

The bias rejection circuit 33 is shown in more detail in FIG. 2, and comprises a differential amplifier 60 having one of its inputs 61 connected to receive the output signal from the variable attenuator 32. The output of the amplifier 60 is connected to one end of a potential divider chain constituted by two series connected resistors R1 and R2, whose resistance values are typically in the ratio 9:1. The junction between the resistors R1 and R2 is connected to provide negative feedback to the other input 62 of the amplifier 60, while the other terminal of the resistor R2, i.e. the other end of the potential divider chain, is connected to receive the output of a scaling operational amplifier 63 via a modulator 72.

The input of the amplifier 63 is connected to the output of an automatically variable attenuator 64, whose attenuation factor is controlled via a control input 64a thereof. The output from the dividing unit 47 is applied to the control input 64a, and is also applied to the input of a digital-to-analogue converter 65. In practice, the output from the unit 47 may be in exponent and mantissa form, in which case the exponent is applied to the attenuator 64 while the mantissa is applied to the converter 65. The converter 65 may comprise in known manner a reference voltage source, a plurality of BCD-weighted (or otherwise suitably weighted) resistors, and a plurality of switches for selectively switching the resistors in response to the digital output from the unit 47, so as to produce from the reference voltage source, by potential division, a D.C. voltage proportional to the magnitude represented by the digital output from the unit 47. The output signal from the converter 65 is applied to the input of the attenuator 64.

The output of the amplifier 60 is also connected via a demodulator 73 to the input of a multiplier 67, which comprises a unity-gain inverting operational amplifier 68 having equal-value input and feedback resistors R3 and R4 respectively. The output of the amplifier 68 is connected via a resistor R5 to the input of a summing amplifier 69, while a bypass channel 70, comprising a field effect transistor switch FET 1 and a resistor R6 in series, is connected from the output of the modulator 73 to the input of the amplifier 69, thus bypassing the operational amplifier 68. The value of the resistor R6 is twice that of the resistor R5, while the gate of the transistor FET1 is connected to be controlled by the control signal from the bistable circuit 22. The gate of the transistor FET 1 is also controlled by an output from the counter/timer 52.

The output of the summing amplifier 69 constitutes the output of the circuit 33, and is applied to the V to F converter 34.

Also included in the bias rejection circuit 33 are suitable isolation transformers (not shown) arranged, e.g. in the converter 65 and at the respective inputs of the attenuator 64 and transistor switch FET 1, to ensure that the signal channel comprising the amplifiers 60, 68, 69 and the channel 70 is fully floating.

The operation of the bias rejection circuit 33 to reject a D.C. component in the output signal from the system 10 is as follows. Suppose the test signal applied to the terminal 10a of the system under test 10 is proportional to sin $wt$, and the output signal from the terminal 10b is $$A \sin wt + B \cos wt + C \qquad (1),$$

where $A \sin wt$ and $B \cos wt$ represent the in-phase and quadrature components respectively of the output signal and C is the magnitude of the D.C. component. This output signal is applied via the attenuator 32 to the bias rejection circuit 33, in which the transistor switch FET 1 is being driven at the frequency of the test signal by the bistable circuit 22. The operation of the transistor switch FET 1 changes the value of the signal at the summing point of the amplifier 69 between equal positive and negative values, so that the gain of the multiplier 67 comprised by the amplifiers 68, 69 and the bypass channel 70 is alternately switched between equal positive and negative values: the multiplier 69 thus effectively multiplies the attenuated output signal from the terminal 10b by a signal sin $wt$ to produce a signal proportional to $$A \sin^2 wt + B \sin wt \cos wt + C \sin wt \qquad (2)$$

The first term of equation 2 represents a D.C. component of the signal, the second represents a double frequency component and the third an in-phase component.

This signal is applied to the V to F converter 34, normalised by the circuit 34a, and effectively multiplied by sin $wt$ again in the adder 38, the result being accumulated in the register 38a over an integral number of cycles of the signal sin $wt$ and divided by the duration of these cycles in the unit 47, as already described with reference to FIG. 1. The result of the multiplication of the first two components of the signal of equation 2 by sin $wt$ is zero, so that the output of the unit 47 is proportional to C, the magnitude of the D.C. component in the output signal from the terminal 10b.

The output from the unit 47 is applied to the converter 65, which is arranged as already mentioned to produce a D.C. voltage proportional thereto: since the output from the unit 47 selectively sets a particular combination of the aforementioned switches in the converter 65, the magnitude of the D.C. component in the output signal from the terminal 10b is effectively stored therein. However, it will be appreciated that, if desired, a buffer store such as a shift register could be provided between the unit 47 and the converter 65. The analogue voltage produced by converter 65 is scaled by the attenuator 64 and amplifier 63 before application to the resistor R2, in such a manner that it cancels the D.C. component in the signal at the input 61 of the amplifier 60.

For example, suppose the output signal from the terminal 10b comprises a 100 volt D.C. component and a 10 volt A.C. component, and suppose that the attenuation factors of the attenuators 32, 64 are initially 1,000 and 10 respectively, corresponding to a full scale measurement of 100 volts. Then the D.C. component at the input 61 of the amplifier 60 is 100 mV, and the output of the converter 65 would typically by 100 mV. The output of the attenuator 64 is therefore 10 mV. In order to cancel the D.C. component at the input 61, i.e. to cause the D.C. level at the output of the amplifier 60 to be zero, the voltage at the junction of the resistors R1 and R2 must be 100 mV: thus the voltage applied to the resistor R2 from the amplifier 63 must be $$100 \times (R_1 + R_2)/R_2 = 111.1 \text{ mV}$$

The gain of the amplifier 63 must therefore be 11.1.

When the bias rejection operation is complete, the transistor switch FET 11 is set and held in its closed (conducting) state by the counter/timer 52, so that the multiplier 67 becomes a simple unity-gain amplifier, and the sequence of operations described with reference to FIG. 1 occurs. However, the 10 volt A.C. component is now being measured on the 100 volt full scale range, so the output from the unit 47 causes the attenuator 32 to change its attenuation factor to 100. This increases the magnitude of the D.C. component at the input 61 to 1 volt. But the output from the unit 47 also changes the attenuation factor of the attenuator 64, from 10 to 1. The output of the amplifier 63 therefore changes to 1.11 volts, which is the new value required to cancel the increased D.C. component at the input 61. The A.C. component can now be measured, with increased resolution, on the 10 volt full scale range.

The operation of the bias rejection circuit 33 to reject a carrier frequency component in the output signal from the system 10 is very similar to its operation in rejecting a D.C. component. Thus the demodulator circuit 72 is supplied with a signal at the carrier frequency, and therefore demodulates the output signal from the system 10 to produce a demodulated signal having a D.C. component whose magnitude is proportional to the amplitude of the carrier frequency component in the output signal from the system 10. It will be appreciated that the demodulated signal still contains the A.C. component of interest resulting from the test signal, and is therefore of the form defined by Equation 1.

The D.C. component in the demodulated signal is processed in the following circuitry exactly as described in relation to the rejection of a D.C. component in the output signal from the system 10, so that the amplifier 63 produces a D.C. output signal whose magnitude is precisely proportional to the magnitude of the D.C. component in the demodulated signal. However, the output signal from the amplifier 63 is modulated in the modulator 73, which is also supplied with a signal at the carrier frequency, to produce a modulated signal at the carrier frequency whose amplitude is proportional to the amplitude of the carrier frequency component in the output signal from the system 10. This modulated signal is applied to the input 62 of the amplifier 60 via the resistor R2, and is thus subtracted from the carrier frequency component at the other input 61. The carrier frequency component in the output signal from the system 10 is thus cancelled, and does not appear at the output of the amplifier 60. Once the carrier frequency component has been cancelled, the measurement of the A.C. component of interest proceeds, with the appropriate resolution, as already described.

Thus it will be appreciated that the TFA hereinbefore described, when used in its D.C. or carrier frequency rejection mode, operates in two successive cycles, in the first of which it effectively measures the component to be rejected and stores the result of the measurement, and in the second of which it uses the stored result of this measurement to back off the unwanted D.C. or carrier frequency component so that the measurements of the A.C. component of interest due to the test signal can be performed at the optimum resolution. It will also be appreciated that when the system 10 is a carrier system, it is assumed that such a system will transmit the carrier frequency component of the signal applied thereto with its phase substantially unchanged: this assumption is normally valid for all commonly met carrier systems likely to be tested with the TFA described herein.

It will be appreciated that many modifications can be made to the described embodiment of the invention. For example, instead of the ROM's 42 and 44 it is possible to use a digital oscillator of known form. Such an oscillator comprises a pair of reversible counters, one initially empty and one initially full, and a pair of binary rate multipliers (BRM's) fed from the synthesizer 13 and each controlled by the counter in a respective counter. The output of each BRM is cross-coupled to the respective input of the other counter, so that the empty counter initially counts upwardly and the full counter initially counts downwardly. It can be readily shown that the counts in the initially empty and initially full counters vary sinusoidally and cosinusoidally respectively. Also, the demodulator 72 can be replaced by a demodulator switch arranged to be driven at the carrier frequency and connected in the control line from the bistable circuit 22 to the gate of the transistor FET 1. Finally, if desired separate multiplying circuitry can be provided for performing the correlation with the test signal on the one hand and the D.C. or carrier frequency rejection on the other hand, thereby permitting rejection and correlation to be operative simultaneously rather than successively.

What is claimed is:

1. Apparatus for measuring the frequency response of an electrical system to a test signal, comprising:

means for producing a test signal of predetermined frequency for application to the system;

first multiplier means for receiving the output signal from the system, which output signal may include a D.C. component in addition to an A.C. component, the first multiplier means being arranged to multiply this output signal by a first signal whose frequency is equal to the frequency of the test signal;

second multiplier means connected to receive the output from the first multiplier means and arranged to multiply it by a second signal whose frequency is equal to the frequency of the test signal, whereby to produce a D.C. signal whose magnitude is dependent upon the magnitude of said D.C. component;

summing means for receiving the output signal from the system;

means for applying the D.C. signal produced by the second multiplier means to the summing means in opposition to said D.C. component, whereby to substantially cancel said D.C. component; and multiplying means operable, when said D.C. component has been cancelled, to multiply the output signal from the summing means by a reference signal whose frequency is equal, or harmonicaly related, to the frequency of the test signal.

2. Apparatus as claimed in claim 1, wherein the first multiplier means is connected to receive the output signal from the system via the summing means and the first and second multiplier means are operative during a first cycle of operation of the apparatus to produce said D.C. signal, and wherein there is provided signal storage means for storing the magnitude of said D.C. signal, and said means for applying the D.C. signal to the summing means is subsequently operative during a second cycle of operation of the apparatus to cancel said D.C. component.

3. Apparatus as claimed in claim 2, wherein the first multiplier means comprises amplifier means connected to receive the output from the summing means, and switch means arranged to change the gain of the amplifier means between equal positive and negative values, the switch means being connected to be driven by said first signal.

4. Apparatus as claimed in claim 3, wherein there is provided means arranged to prevent operation of the first multiplier means when said D.C. has been backed off, and wherein the second multiplier means is constituted by at least part of the multiplying means.

5. Apparatus as claimed in claim 4, wherein the means for preventing operation of the first multiplier comprises means for setting said switch means in one of its two states.

6. Apparatus as claimed in claim 1, wherein the test signal generating means comprises a source of a synchronizing signal, and first means responsive to the synchronizing signal to derive the test signal therefrom at a lower frequency than that of the synchronizing signal, and the multiplying means comprises second means responsive to the synchronizing signal to produce a sequency of digital signals representative of successive point values in a cycle of the reference signal, third means responsive to the output signal from the summing means to convert the instantaneous value of this signal to a frequency represented by a train of pulses, and means for accumulating the values generated by the second means at a rate determined by the rate of the said pulses.

7. Apparatus as claimed in claim 6, wherein the second means comprises a ROM providing both sine and cosine outputs and a counter controlled by the synchronizing signal and addressing the ROM for read-out of the point values therefrom.

8. Apparatus as claimed in claim 6, wherein the first means is adapted to generate the test signal digitally by a process of frequency division of the synchronizing signal and digital-to-analogue conversion.

9. Apparatus as claimed in claim 6, wherein the accumulating means includes a fast parallel adder operating in BCD.

10. Apparatus for measuring the frequency response of an electrical system to a test signal, comprising:
   means for producing a test signal of predetermined frequency;
   modulating means for modulating a carrier signal having a higher frequency than that of the test signal with the test signal, to produce a modulated signal for application to the system;
   demodulating means for receiving and demodulating the output signal from the system, so as to produce a demodulated signal having a D.C. component whose magnitude is dependent upon the amplitude of the carrier frequency component of the output signal from the system;
   first multiplier means arranged to multiply the demodulated signal produced by the demodulating means by a first signal whose frequency is equal to the frequency of the test signal;
   second multiplier means arranged to multiply the output of the first multiplier means by a second signal whose frequency is equal to the frequency of the test signal, so as to produce a D.C. signal whose magnitude is dependent upon said D.C. component;
   means for modulating said D.C. signal at the carrier frequency to produce a feedback carrier frequency signal whose amplitude is dependent upon the amplitude of the carrier frequency component of the output signal from the system;
   summing means for receiving the output signal from the system;
   means for applying said feedback carrier frequency signal to the summing means in opposition to said carrier frequency component in the output signal from the system, so as to substantially cancel said carrier frequency component; and
   multiplying means operable when said carrier frequency component has been cancelled to multiply the output signal from the summing means by a reference signal whose frequency is equal, or harmonically related, to the frequency of the test signal.

11. Apparatus as claimed in claim 10, wherein the demodulating means is connected to receive the output signal from the system via the summing means, and the first and second multiplier means are operative during a first cycle of operation of the apparatus to produce said D.C. signal, and wherein there is provided signal storage means for storing the magnitude of said D.C. signal, and said means for applying said feedback carrier frequency signal to the summing means is subsequently operative during a second cycle of operation of the apparatus to cancel said carrier frequency component.

12. Apparatus as claimed in claim 11, wherein the first multiplier means comprises amplifier means connected to receive the output signal from the demodulating means, and switch means arranged to change the gain of the amplifier means between equal positive and negative values, the switch means being connected to be driven by said first signal.

13. Apparatus as claimed in claim 12, wherein there is provided means arranged to prevent operation of the first multiplier means when said carrier frequency component has been backed off, and wherein the second multiplier means is constituted by at least part of the multiplying means.

14. Apparatus as claimed in claim 13, wherein the means for preventing operation of the first multiplier comprises means for setting said switch means in one of its two states.

15. Apparatus for measuring the frequency response of an electrical system to a test signal, comprising:
   a source of a synchronizing signal;
   first means responsive to the synchronizing signal to derive a test signal at a lower frequency than that of the synchronizing signal for application to the system;
   second means responsive to the synchronizing signal to produce a sequence of digital signals representative of successive point values in a cycle of a reference signal;
   third means responsive to the output signal from the system to convert th instantaneous value of this signal to a frequency represented by a train of pulses; and
   means for accumulating the values generated by the second means at a rate determined by the rate of the said pulses.

16. Apparatus as claimed in claim 15, wherein the second means comprises a ROM providing both sine and cosine outputs and a counter controlled by the synchronizing signal and addressing the ROM for read-out of the point values therefrom.

17. Apparatus as claimed in claim 15, wherein the first means is adapted to generate the test signal digitally by a process of frequency division of the synchronizing signal and digital-to-analogue conversion.

18. Apparatus as claimed in claim 15, wherein the accumulating means includes a fast parallel added operating in BCD.

* * * * *